United States Patent
Asari et al.

(10) Patent No.: US 9,593,869 B2
(45) Date of Patent: Mar. 14, 2017

(54) CASCADE REFRIGERATION CYCLE APPARATUS

(71) Applicant: TOSHIBA CARRIER CORPORATION, Minato-ku, Tokyo (JP)

(72) Inventors: Shun Asari, Fuji (JP); Takahiro Zushi, Fuji (JP)

(73) Assignee: TOSHIBA CARRIER CORPORATION, Tokyo (JP)

( * ) Notice: Subject to any disclaimer, the term of this patent is extended or adjusted under 35 U.S.C. 154(b) by 591 days.

(21) Appl. No.: 14/029,571

(22) Filed: Sep. 17, 2013

(65) Prior Publication Data
US 2014/0013790 A1 Jan. 16, 2014

Related U.S. Application Data

(63) Continuation of application No. PCT/JP2012/056929, filed on Mar. 16, 2012.

(30) Foreign Application Priority Data

Mar. 18, 2011 (JP) .................................. 2011-061546

(51) Int. Cl.
*F25B 7/00* (2006.01)
*F25B 1/00* (2006.01)

(52) U.S. Cl.
CPC ................ *F25B 7/00* (2013.01); *F25B 1/00* (2013.01); *F25B 2400/0401* (2013.01)

(58) Field of Classification Search
CPC ................ F25B 7/00; F25B 2600/021; F25B 2600/0253; F25B 2600/0271;
(Continued)

(56) References Cited

U.S. PATENT DOCUMENTS 4,854,130 A * 8/1989 Naruse .................... F25B 41/04
                                                    62/278
6,216,478 B1 * 4/2001 Kang ...................... F25D 29/00
                                                    62/228.4

FOREIGN PATENT DOCUMENTS

JP      04-332350 A    11/1992
JP      06-288985 A    10/1994
(Continued)

OTHER PUBLICATIONS

Machine Translation of Description of JPH06288985; retreived on May 2016.*
(Continued)

*Primary Examiner* — Orlando E Aviles Bosques
(74) *Attorney, Agent, or Firm* — Holtz, Holtz & Volek PC

(57) ABSTRACT

According to one embodiment, a cascade refrigeration cycle apparatus according to the present embodiment includes a high-temperature-side and a low-temperature-side refrigeration circuits, an inverter and a control section. The high-temperature-side refrigeration circuit includes a first compressor and a cascade heat exchanger. The low-temperature-side refrigeration circuit includes a second compressor and the cascade heat exchanger. The inverter connected to at least one of the compressors. The control section controls the inverter so that a set operating frequency for the first compressor is higher than a set operating frequency for the second compressor when an operation of the apparatus is started.

1 Claim, 6 Drawing Sheets

(58) Field of Classification Search
CPC ...... F25B 2600/2501; F25B 2400/0401; F25B 47/02; F25B 47/022; F25B 47/025; F25B 2347/00; F25B 2347/02
See application file for complete search history.

(56) References Cited

FOREIGN PATENT DOCUMENTS

| | | |
|---|---|---|
| JP | 09-269155 A | 10/1997 |
| JP | 3175709 B2 | 6/2001 |
| JP | 2002-181430 A | 6/2002 |
| JP | 2007-198693 A | 8/2007 |
| JP | 4159243 B2 | 10/2008 |
| WO | WO 2010/113372 A1 | 10/2010 |

OTHER PUBLICATIONS

English translation of an International Preliminary Report on Patentability (IPRP) including Written Opinion dated Oct. 3, 2013 in parent International Application No. PCT/JP2012/056929.
International Search Report (ISR) dated Jun. 12, 2012 (and English translation thereof) issued in International Application No. PCT/JP2012/056929.

* cited by examiner

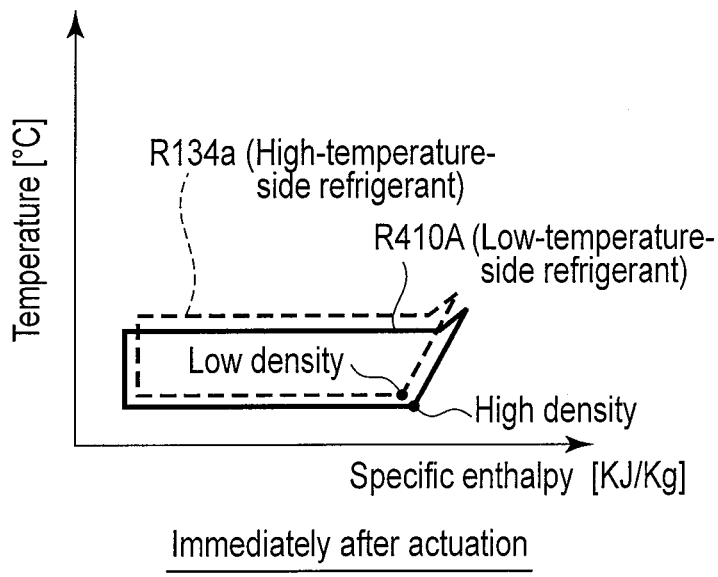
Immediately after actuation
F I G. 2A
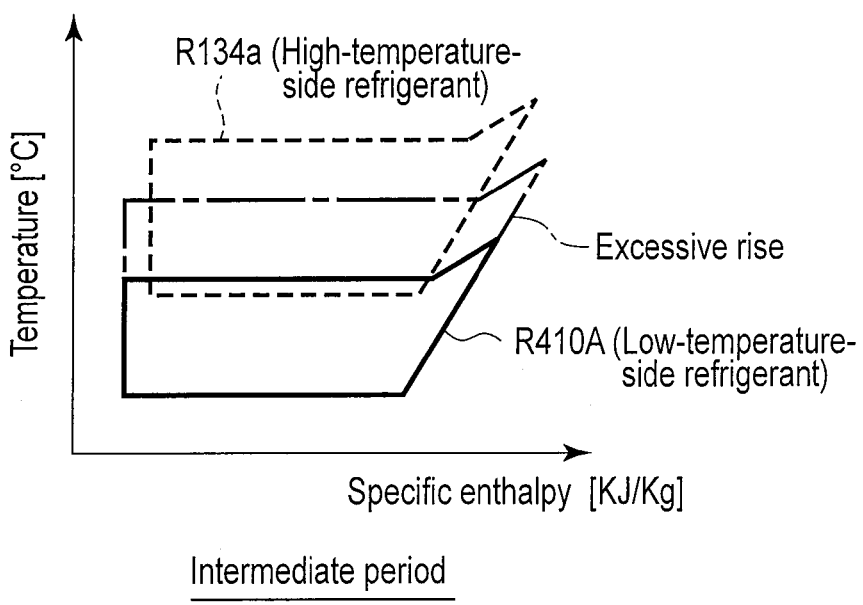
Intermediate period
F I G. 2B

CASCADE REFRIGERATION CYCLE APPARATUS

CROSS REFERENCE TO RELATED APPLICATIONS

This application is a Continuation Application of PCT Application No. PCT/JP2012/056929, filed Mar. 16, 2012 and based upon and claiming the benefit of priority from Japanese Patent Application No. 2011-061546, filed Mar. 18, 2011, the entire contents of all of which are incorporated herein by reference.

BACKGROUND OF THE INVENTION

1. Field of the Invention

Embodiments described herein relate generally to a cascade refrigeration cycle apparatus comprising a high-temperature-side refrigeration circuit and a low-temperature-side refrigeration circuit.

2. Description of the Related Art

A cascade refrigeration cycle apparatus is available which comprises a high-temperature-side refrigeration circuit and a low-temperature-side refrigeration circuit which share one cascade heat exchanger (intermediate heat exchanger) allowing heat to be exchanged between a refrigerant circulating through the high-temperature-side refrigeration circuit and a refrigerant circulating through the low-temperature-side refrigeration circuit, thus achieving a high compression ratio.

In general, the high-temperature-side refrigerant, used for the high-temperature-side refrigeration circuit, has a higher boiling point than the low-temperature-side refrigerant, used for the low-temperature-side refrigeration circuit. In other words, the low-temperature-side refrigerant has a lower boiling point and a higher pressure than the high-temperature-side refrigerant. Thus, a saturation gas density at the same temperature is lower for the high-temperature-side refrigerant than for the low-temperature-side refrigerant.

PRIOR ART DOCUMENT

Patent Document
  Patent Document 1 Japanese Patent No. 3175709

BRIEF SUMMARY OF THE INVENTION

Problems to Be Solved by the Invention

When the above-described refrigerants are used to start a refrigeration cycle operation on a high-temperature-side compressor in the high-temperature-side refrigeration circuit and a low-temperature-side compressor in the low-temperature-side refrigeration circuit at the same operating frequency, the mass flow of the refrigerant on the low-temperature-side refrigeration circuit side increases, precluding the cascade heat exchanger from sufficiently radiating heat from the low-temperature-side refrigerant. Thus, a high-pressure-side pressure in the low-temperature-side refrigeration circuit increases excessively to activate a protect apparatus immediately after the actuation of the compressors, resulting in shutdown.

Thus, the cascade refrigeration cycle apparatus desirably comprises a cascade refrigeration cycle and suppresses an excessive rise in the high pressure of the refrigerant in the low-temperature-side refrigeration circuit when the refrigeration cycle operation is started.

Means for Solving the Problems

A cascade refrigeration cycle apparatus according to the present embodiment includes a high-temperature-side refrigeration circuit, a low-temperature-side refrigeration circuit, an inverter and a control section. The high-temperature-side refrigeration circuit includes a high-temperature-side compressor, a high-temperature-side condenser, a high-temperature-side expander, and a cascade heat exchanger which are in communication with one another via refrigerant piping. The low-temperature-side refrigeration circuit includes a low-temperature-side compressor, the cascade heat exchanger, a low-temperature-side expander, and an air-heat exchanger which are in communication with one another via refrigerant piping, the low-temperature-side refrigeration circuit being mounted in an identical housing in which the high-temperature-side refrigeration circuit is mounted. The inverter connected to at least one of the high-temperature-side compressor and the low-temperature-side compressor. The control section controls the inverter so that a set operating frequency for the high-temperature-side compressor is higher than a set operating frequency for the low-temperature-side compressor when an operation of the apparatus is started.

BRIEF DESCRIPTION OF THE SEVERAL VIEWS OF THE DRAWING

FIG. 2A is a schematic temperature-specific enthalpy diagram of a high-temperature-side refrigerant and a low-temperature-side refrigerant during a period from immediately after the beginning of a refrigeration cycle operation through an intermediate period until a stable operating state is attained according to the embodiment.

FIG. 2B is a schematic temperature-specific enthalpy diagram of the high-temperature-side refrigerant and the low-temperature-side refrigerant during the period from immediately after the beginning of the refrigeration cycle operation through the intermediate period until the stable operating state is attained according to the embodiment.

DETAILED DESCRIPTION OF THE INVENTION

The present embodiment will be described below with reference to the drawings.

Figure 1:
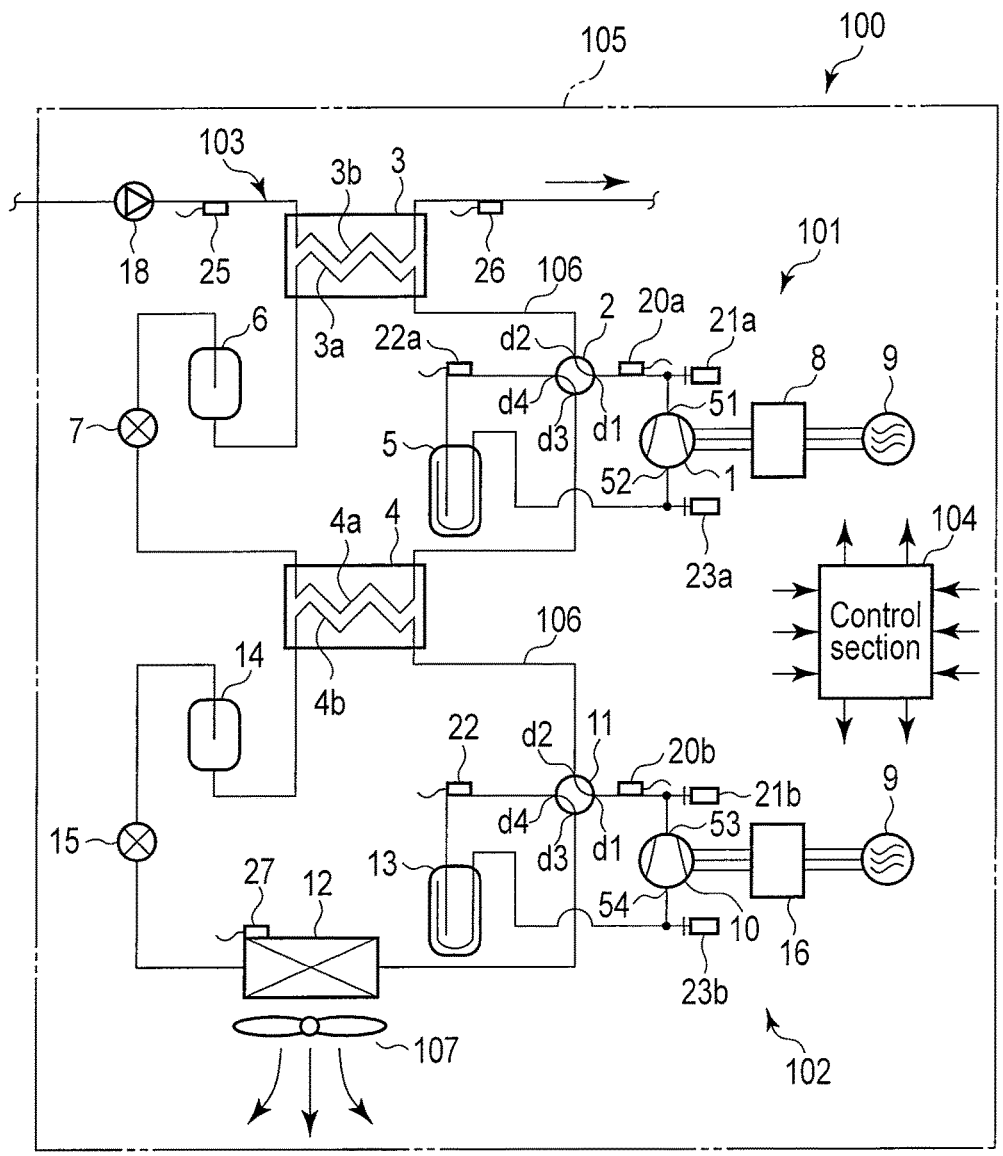
FIG. 1 is a diagram of a refrigeration cycle configuration of a cascade refrigeration cycle apparatus according to a first embodiment.

FIG. 1 is a diagram of a refrigeration cycle configuration of a cascade refrigeration cycle apparatus 100 used as a hot water supply system according to a first embodiment.

The cascade refrigeration cycle apparatus 100 used as a hot water supply system comprises a high-temperature-side refrigeration circuit 101, a low-temperature-side refrigeration circuit 102, hot water piping 103, and a control section (control means) 104 which are mounted in an identical housing 105.

In the high-temperature-side refrigeration circuit 101, a discharge section 51 of a high-temperature-side compressor 1 is connected to a first port d1 of a four-way selector valve 2 via refrigerant piping 106. A primary-side channel 3a in a water heat exchanger 3 is connected to a second port d2 of the four-way selector valve 2 via the refrigerant piping 106. A third port d3 of the four-way selector valve 2 is connected to a primary-side channel 4a in a cascade heat exchanger 4 via the refrigerant piping 106.

A fourth port d4 of the four-way selector valve 2 is connected to the suction section 52 of the high-temperature-side compressor 1 via a high-temperature-side accumulator 5 and the refrigerant piping 106. On the other hand, the primary-side channel 3a in the water heat exchanger 3 is connected to a primary-side channel 4a in the cascade heat exchanger 4 via the refrigerant piping 106 with a high-temperature-side receiver 6 and a high-temperature-side expander 7 disposed in series.

The high-temperature-side compressor 1 is electrically connected to a commercial AC power supply 9 via a high-temperature-side inverter apparatus 8. Thus, the high-temperature-side compressor 1 is driven at a variable speed by inverter control with a variable operating frequency. The high-temperature-side compressor 1 is different from a constant-speed compressor with an operating frequency depending on a power supply frequency.

In the low-temperature-side refrigeration circuit 102, a discharge section 53 of a low-temperature-side compressor 10 is connected to a first port d1 of a four-way selector valve 11 via the refrigerant piping 106. A secondary-side channel 4b in the cascade heat exchanger 4 is connected to a second port d2 of the four-way selector valve 11 via the refrigerant piping 106. A third port d3 of the four-way selector valve 11 is connected to an air heat exchanger 12 via the refrigerant piping 106.

A fourth port d4 of the four-way selector valve 11 is connected to a suction section 54 of the high-temperature-side compressor 1 via a low-temperature-side accumulator 13 and the refrigerant piping 106. On the other hand, the secondary-side channel 4b in the cascade heat exchanger 4 is connected to the air heat exchanger 12 via the refrigerant piping 106 with a low-temperature-side receiver 14 and a low-temperature-side expander 15 disposed in series.

A blower fan 107 is disposed opposite the air heat exchanger 12. The low-temperature-side compressor 10 is electrically connected to the commercial AC power supply 9 via a low-temperature-side inverter apparatus 16. Thus, the low-temperature-side compressor 10 is driven at a variable speed by inverter control with a variable operating frequency. The low-temperature-side compressor 10 is different from a constant-speed compressor with an operating frequency depending on a power supply frequency.

The hot water piping 103 is connected to a water supply source, a hot water storage tank, or a suction section of a condensate side (return side) buffer tank at one end thereof and to a hot water storage tank, a hot water tap, or a feed water side (utilization side) buffer tank at the other end thereof.

A water conveying pump 18 and a secondary-side channel 3b installed in the water heat exchanger 3 are provided in a middle portion of the hot water piping 103. Thus, water or hot water guided through the hot water piping 103 exchanges heat with a refrigerant guided through the primary-side channel 3a, in the secondary-side channel 3b in the water heat exchanger 3.

The control section 104 receives detection signals, at every predetermined time intervals, from temperature sensors 20a and 20b and pressure sensors 21a and 21b provided on a discharge section 51, 53 side of the high-temperature-side compressor 1 and the low-temperature-side compressor 10, respectively, and temperature sensors 22a and 22b and pressure sensors 23a and 23b provided on a suction section 52, 54 side of the high-temperature-side compressor 1 and the low-temperature-side compressor 10, respectively.

Moreover, the control section 104 receives detection signals at predetermined time intervals from a water temperature sensor 25 provided on an inlet side of the secondary-side channel 3b in the water heat exchanger 3 on the hot water piping 103 and a water temperature sensor 26 and a flow sensor both provided at an outlet side. The control section 104 also receives detection signals from a temperature sensor provided in the cascade heat exchanger 4 and a temperature sensor 27 provided in the air heat exchanger 12.

Moreover, the control section 104 receives instruction signals from a remote controller. The control section 104 calculates detection signals received from the sensors and the remote controller and compares the values of the signals with stored reference values. The control section 104 sets and controls operating frequencies for the high-temperature-side compressor 1 and the low-temperature-side compressor 10. The control section 104 opens and closes the high-temperature-side expander 7 and the low-temperature-side expander 15 in a controllable manner and controls the amount of throttling for the high-temperature-side expander 7 and the low-temperature-side expander 15.

In the thus configured cascade refrigeration cycle apparatus 100, the control section 104 receives an instruction to start a refrigeration cycle operation (heating operation mode) to guide refrigerants through the high-temperature-side refrigeration circuit 101 and the low-temperature-side refrigeration circuit 102 for circulation control as described below.

In the high-temperature-side refrigeration circuit 101, the control section 104 guides the refrigerant compressed and discharged from the high-temperature-side compressor 1 through the four-way selector valve 2, the primary-side channel 3a in the water heat exchanger 3, the high-temperature-side receiver 6, the high-temperature-side expander 7, the primary-side channel 4a in the cascade heat exchanger 4, the four-way selector valve 2, the high-temperature-side accumulator 5, and the high-temperature-side compressor 1 in this order for circulation.

Thus, the primary-side channel 3a in the water heat exchanger 3 acts as a condenser. The primary-side channel 4a in the cascade heat exchanger 4 acts as an evaporator.

In the low-temperature-side refrigeration circuit 102, the control section 104 guides the refrigerant compressed and discharged by the low-temperature-side compressor 10 through the four-way selector valve 11, the secondary-side channel 4b in the cascade heat exchanger 4, the low-temperature-side receiver 14, the low-temperature-side expander 15, the air heat exchanger 12, the four-way selector valve 11, the low-temperature-side accumulator 13, and the low-temperature-side compressor 10 in this order for circulation.

Thus, the secondary-side channel 4b in the cascade heat exchanger 4 acts as a condenser. The air heat exchanger 12 acts as an evaporator. In the cascade heat exchanger 4, the refrigerant is condensed to discharge condensation heat in the secondary-side channel 4b on the low-temperature-side refrigeration circuit 102 side, whereas the refrigerant evaporates while absorbing condensation heat in the primary-side channel 4a on the high-temperature-side refrigeration circuit 101 side.

In the cascade refrigeration cycle apparatus 100 as a whole, the difference between an evaporation temperature in the air heat exchanger 12 and a condensation temperature in the water heat exchanger 3 increases to provide an increased compression ratio. Water or hot water guided through the hot water piping 103 absorbs, in the secondary-side channel 3b in the water heat exchanger 3, high concentration heat from the primary-side channel 3a of the water heat exchanger 3, which performs a condensation action in the high-temperature-side refrigeration circuit 101, to efficiently become hotter.

In the secondary-side channel 3b in the water heat exchanger 3, water or hot water guided from the water supply source, the hot water storage tank, or the condensate side (return side) buffer tank changes into hot water with the temperature thereof increased, which circulates so as to be guided from the water heat exchanger 3 to the hot water storage tank or the feed water side (utilization side) buffer tank. Alternatively, the water or hot water is fed from the water heat exchanger 3 directly to the hot water tap.

In particular, when the refrigeration cycle operation continues when the outside air temperature is low, the air heat exchanger 12 in the low-temperature-side refrigeration circuit 102 operates to evaporate the refrigerant. Thus, condensate generated in the air heat exchanger 12 may freeze and produce frost, which may attach to the air heat exchanger 12 without any change. In this case, the frost becomes thicker over time, reducing the heat exchange efficiency of the air heat exchanger 12.

The control section 104 receives detection signals from the temperature sensor 27 attached to the air heat exchanger 12 and also receives detection signals from the other sensors to determine whether a defrosting operation is needed for the air heat exchanger 12. Based on the result of the determination, the apparatus is switched to a defrosting operation mode, and the control section 104 performs control described below.

That is, the control section 104 simultaneously switches the four-way selector valve 2 in the high-temperature-side refrigeration circuit 101 and the four-way selector valve 11 in the low-temperature-side refrigeration circuit 102 in a controllable manner. In each of the refrigeration circuits 101 and 102, the refrigerant circulates in a direction opposite to the direction during the refrigeration cycle operation described above.

In the low-temperature-side refrigeration circuit 102, a high temperature and pressure gas refrigerant discharged from the low-temperature-side compressor 10 is guided to the air heat exchanger 12 via the four-way selector valve 11 to emit high heat. Thus, the frost attached to the air heat exchanger 12 gradually melts into dripping drain water. The frost becomes thinner over time. Thus, a defrosting action is performed.

Since the above-described cascade refrigeration cycle apparatus 100 is applied to the hot water supply system, the cascade refrigeration cycle apparatus 100 comprises the water heat exchanger 3 and uses the primary-side channel 3a in the water heat exchanger 3 as a high-temperature-side compressor in the high-temperature-side refrigeration circuit 101 to exchange heat with water or hot water guided through the secondary-side channel 3b. The cascade refrigeration cycle apparatus 100 further comprises and uses the air heat exchanger 12 as a low-temperature-side evaporator in the low-temperature-side refrigeration circuit 102 to allow the low-temperature-side refrigerant and the air to exchange heat.

The cascade refrigeration cycle apparatus 100 is not limited to the hot water supply system. The cascade refrigeration cycle apparatus 100 is configured according to an installation site and is not limited to the above-described embodiment.

The high-temperature-side refrigeration circuit 101 and the low-temperature-side refrigeration circuit 102 comprise containers for the receivers 6 and 14 and the accumulators 5 and 13, respectively. However, if the containers are unwanted according to use conditions, the containers may be removed. Similarly, if the refrigeration circuits 101 and 102 need not perform the opposite cycles, one or both of the four-way selector valve 2 and 11 may be removed.

Both the high-temperature-side compressor 1 and the low-temperature-side compressor 10 are based on inverter driving such that the compressors 1 and 10 can be connected to the inverter apparatus 8 and 16 to allow the operating frequencies to be adjusted. However, the compressors 1 and 10 need not be limited to this configuration. One of the compressors 1 and 10 may be configured, without any problem, as a constant-speed compressor with a rotation speed depending on a power supply frequency.

In the thus configured cascade refrigeration cycle apparatus 100, the refrigerant used for the high-temperature-side refrigeration circuit 101 has a lower saturation gas density and a lower pressure at the same temperature than the refrigerant in the low-temperature-side refrigeration circuit 102.

In the present embodiment, an "R134a" refrigerant shown below in [Table 1] was selected as the high-temperature-side refrigerant for the high-temperature-side refrigeration circuit 101. A "R410A" refrigerant was selected as the low-temperature-side refrigerant for the low-temperature-side refrigeration circuit 102.

TABLE 1

| Refrigerant | | R32 | R410A | R404A | R407C | R134a | R245fa |
|---|---|---|---|---|---|---|---|
| Saturation temperature (degree of dryness = 1) | ° C. | 30.0 | 30.0 | 30.0 | 30.0 | 30.0 | 30.0 |
| Pressure (degree of dryness = 1) | kPa_A | 1927.5 | 1883.5 | 1414.4 | 1175.9 | 770.2 | 177.8 |
| Gas density (degree of dryness = 1) | kg/m3 | 54.8 | 76.6 | 75.6 | 50.8 | 37.5 | 10.2 |
| Liquid density (degree of dryness = 0) | kg/m3 | 939.6 | 1033.4 | 1021.4 | 1139.4 | 1187.5 | 1324.9 |

That is, the high-temperature-side refrigeration circuit 101 and the low-temperature-side refrigeration circuit 102 use different temperature regions and thus different condensation temperatures and evaporation temperatures. For example, when both the refrigeration circuits 101 and 102 use the same refrigerant, the withstanding pressure of pressure containers differs between the high-temperature-side refrigeration circuit 101 and the low-temperature-side refrigeration circuit 102. Thus, dedicated containers need to be designed for each of the high-temperature-side refrigeration circuit 101 and the low-temperature-side refrigeration circuit 102. This increases costs.

Furthermore, for example, when the refrigerants used have the same saturation gas density at the same temperature, the high-temperature-side refrigeration circuit 101 operates in a higher temperature region within a practical temperature range as described above and thus has a higher refrigerant density.

On the other hand, heating capacity is expressed by the product of a refrigerant heating enthalpy difference and a mass flow. The mass flow is expressed by the product of the suction refrigerant density of the compressor, the displacement volume of the compressor, and the rotation speed of the compressor (in actuality, a volumetric efficiency and a leakage loss are also taken into account, but the mass flow is theoretically expressed by the above-described formula).

Hence, if the compressors 1 and 10 used for the high-temperature-side refrigeration circuit 101 and the low-temperature-side refrigeration circuit 102 have the same displacement volume, the low-temperature-side compressor 10 needs to rotate at a higher speed than the high-temperature-side compressor 1 in order to achieve the maximum compression capacity. This leads to the need to optimally design motors for high-speed operation or to use large-sized compressors, increasing costs.

As described above, the present embodiment uses "R134a" refrigerant as the high-temperature-side refrigerant and "R410A" refrigerant as the low-temperature-side refrigerant. However, the present embodiment is not limited to these refrigerants.

Figure 2C:
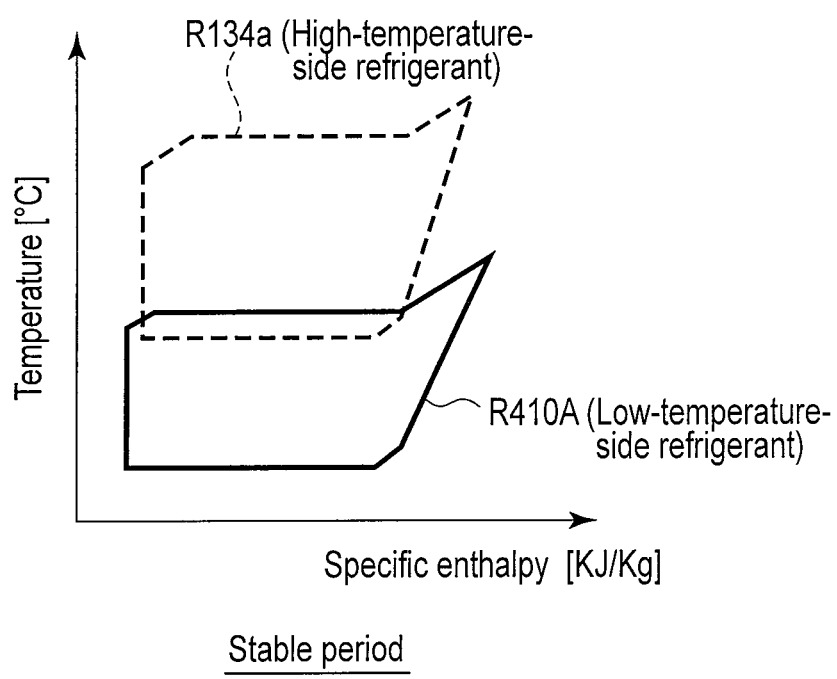
FIG. 2C is a schematic temperature-specific enthalpy diagram of the high-temperature-side refrigerant and the low-temperature-side refrigerant during the period from immediately after the beginning of the refrigeration cycle operation through the intermediate period until the stable operating state is attained according to the embodiment.

FIG. 2A to FIG. 2C are schematic temperature-specific enthalpy diagrams for the high-temperature-side refrigerant and the low-temperature-side refrigerant during a period from immediately after the beginning of a refrigeration cycle operation through an intermediate period until a stable operating state is attained.

As shown in FIG. 2A, immediately after the refrigeration cycle operation starts, the high-temperature-side refrigerant (R134a: shown by a dashed line) on the high-temperature-side refrigeration circuit 101 side and the low-temperature-side refrigerant (R410a: shown by a solid line) on the low-temperature-side refrigeration circuit 102 side have substantially the same temperature, which is substantially comparable to ambient temperature. As described above, the high-temperature-side refrigerant has a lower saturation gas density than the low-temperature-side refrigerant at the same temperature.

In such a state, an attempt is made to simultaneously drive both the compressors 1 and 10 in the high-temperature-side refrigeration circuit 101 and the low-temperature-side refrigeration circuit 102 at the same rotation speed. Essentially, during the intermediate period, which starts a predetermined time after the beginning of actuation, both the low-temperature-side refrigerant and the high-temperature-side refrigerant change as shown in FIG. 2B. During the stable period, the low-temperature-side refrigerant and the high-temperature-side refrigerant are in such a state as shown in FIG. 2C.

However, since the high-temperature-side refrigerant has a lower saturation gas density, the low-temperature-side refrigerant has a higher mass flow than the high-temperature-side refrigerant during the intermediate period. In the cascade heat exchanger 4, the low-temperature-side refrigerant fails to sufficiently emit heat. The high-pressure-side pressure in the low-temperature-side refrigeration circuit 102 excessively rises as shown by an alternate long and short dash line in FIG. 2B. When the protect apparatus detects this condition, the refrigeration cycle operation is stopped.

In contrast, in the present embodiment, both the high-temperature-side compressor 1 and the low-temperature-side compressor 10 are connected to the inverter apparatuses 8 and 16, respectively, for inverter control. When a refrigeration cycle operation (heating operation mode) is started, the control section 104 reduces the set operating frequency for the low-temperature-side compressor 10 in a controllable manner so as to make the set operating frequency for the high-temperature-side compressor 1 higher than the set operating frequency for the low-temperature-side compressor 10.

This increases the mass flow of the high-temperature-side refrigerant above the mass flow of the low-temperature-side refrigerant, eliminating the insufficiency of evaporation capacity of the primary-side channel 4a in the cascade heat exchanger 4 immediately after actuation.

A possible excessive rise in the high-pressure-side pressure in the low-temperature-side refrigeration circuit 102 is inhibited to set the low-temperature-side refrigerant to its original state as shown by a solid line in FIG. 2B. The low-temperature-side refrigeration circuit 102 then enters the stable period in FIG. 2C. The protect apparatus is prevented from being activated, and a stable refrigeration cycle operation is performed.

The above-described control is performed only in the heating operation mode, which is a normal refrigeration cycle operation, and not in the defrosting operation mode. In the defrosting operation mode, the starting rotation speeds of the high-temperature-side compressor 1 and the low-temperature-side compressor 10 are desirably determined by the temperature of water or hot water guided to the hot water piping 103.

That is, during the defrosting operation, the air heat exchanger 12 is frosted, and thus, the condensation temperature in the low-temperature-side refrigeration circuit 102 is about 5 to 15° C. In contrast, the condensation temperature in the high-temperature-side refrigeration circuit 101 may vary significantly depending on the temperature of water or hot water guided through the hot water piping 103.

For example, when the hot water is about 80° C., the evaporation temperature and condensation temperature in the high-temperature-side refrigeration circuit 101 are expected to be about 60 to 70° C. and at least about 70 to 80° C., respectively. In contrast, the evaporation temperature in the low-temperature-side refrigeration circuit 102 is about 0 to 5° C.

When the defrosting operation is started, if the set operating frequency for the high-temperature-side compressor 1 is made higher than the set operating frequency for the low-temperature-side compressor 10 in a controllable manner, the high-pressure-side pressure in the high-temperature-side refrigeration circuit 101 may excessively rise, abnormally stopping the high-temperature-side refrigeration circuit 101. Hence, the actuation control by the control section 104 described above may be used exclusively in the heating operation mode.

Figure 3:
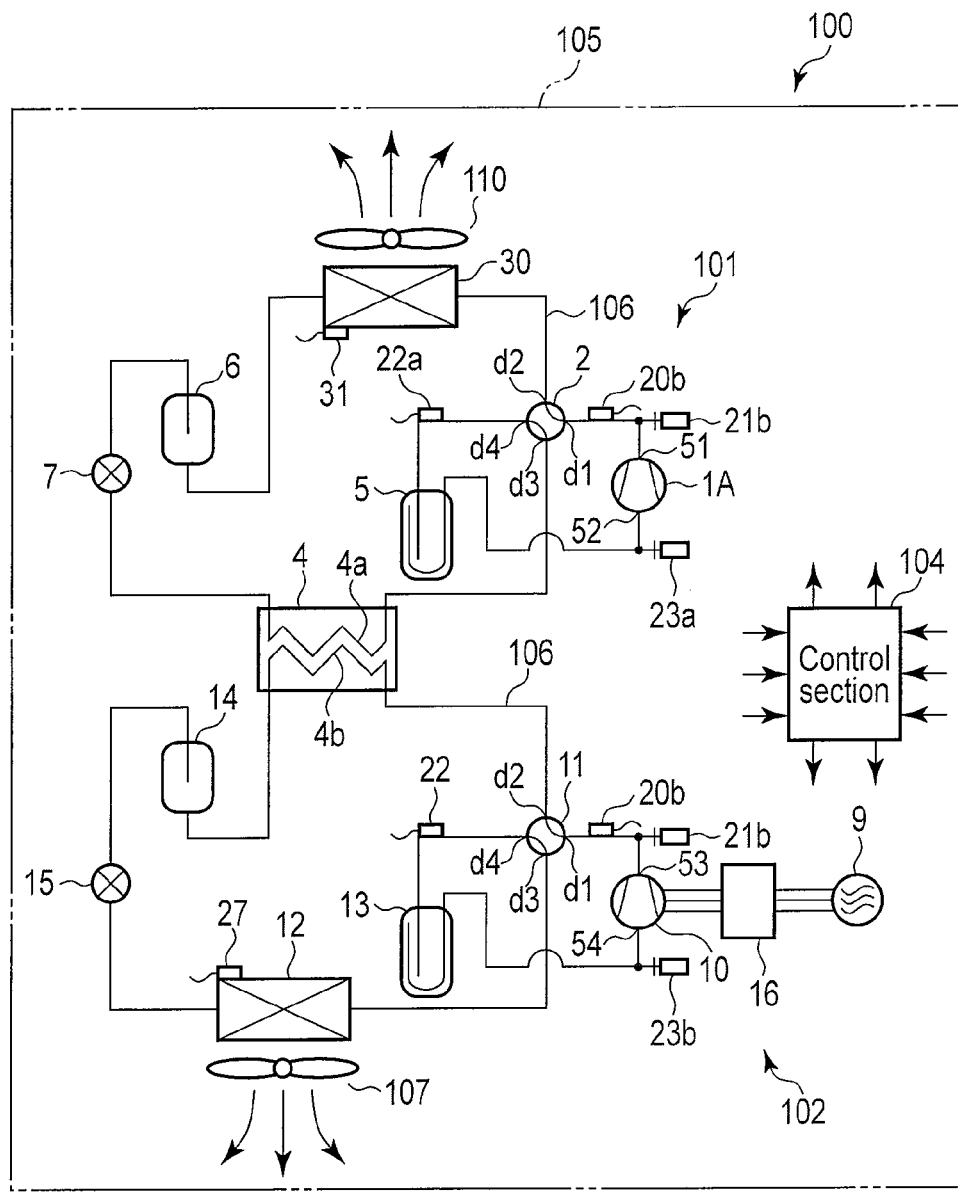
FIG. 3 is a diagram of a refrigeration cycle configuration of a cascade refrigeration cycle apparatus according to a second embodiment.

FIG. 3 is a diagram of a refrigeration cycle configuration of the cascade refrigeration cycle apparatus 100 applied to an air conditioner according to a second embodiment. In this case, the same components of the second embodiment as the corresponding components of the first embodiment shown in FIG. 1 are denoted by the same reference numbers and will not be newly described.

The low-temperature-side refrigeration circuit 102 is applied without any change. The inverter apparatus 16 is connected to the low-temperature-side compressor 10 as is the case with the first embodiment. Since the cascade refrigeration cycle apparatus 100 according to the second embodiment is applied to the air conditioner, the high-temperature-side refrigeration circuit 101 comprises an air heat exchanger 30, a fan 110, and a temperature sensor 31 attached to the air heat exchanger 30 to detect the temperature thereof.

A main feature of the cascade refrigeration cycle apparatus 100 according to the second embodiment is that the high-temperature-side compressor 1 used for the high-temperature-side refrigeration circuit 101 uses a constant-speed compressor 1A with an operating frequency depending on the power supply frequency. When a refrigeration cycle operation is started, the high-temperature-side compressor 1A performs a constant-speed operation. The control section 104 performs inverter control on the low-temperature-side compressor 10 to set the operating frequency for the low-temperature-side compressor 10 lower than the operating frequency for the high-temperature-side compressor 1A in a controllable manner.

This allows prevention of a possible excessive increase in the high-pressure-side pressure in the low-temperature-side refrigeration circuit 102. Alternatively, in contrast, inverter control may be performed exclusively on the high-temperature-side compressor 1A, with the low-temperature-side compressor 10 operating as a constant-speed compressor.

Figure 4:
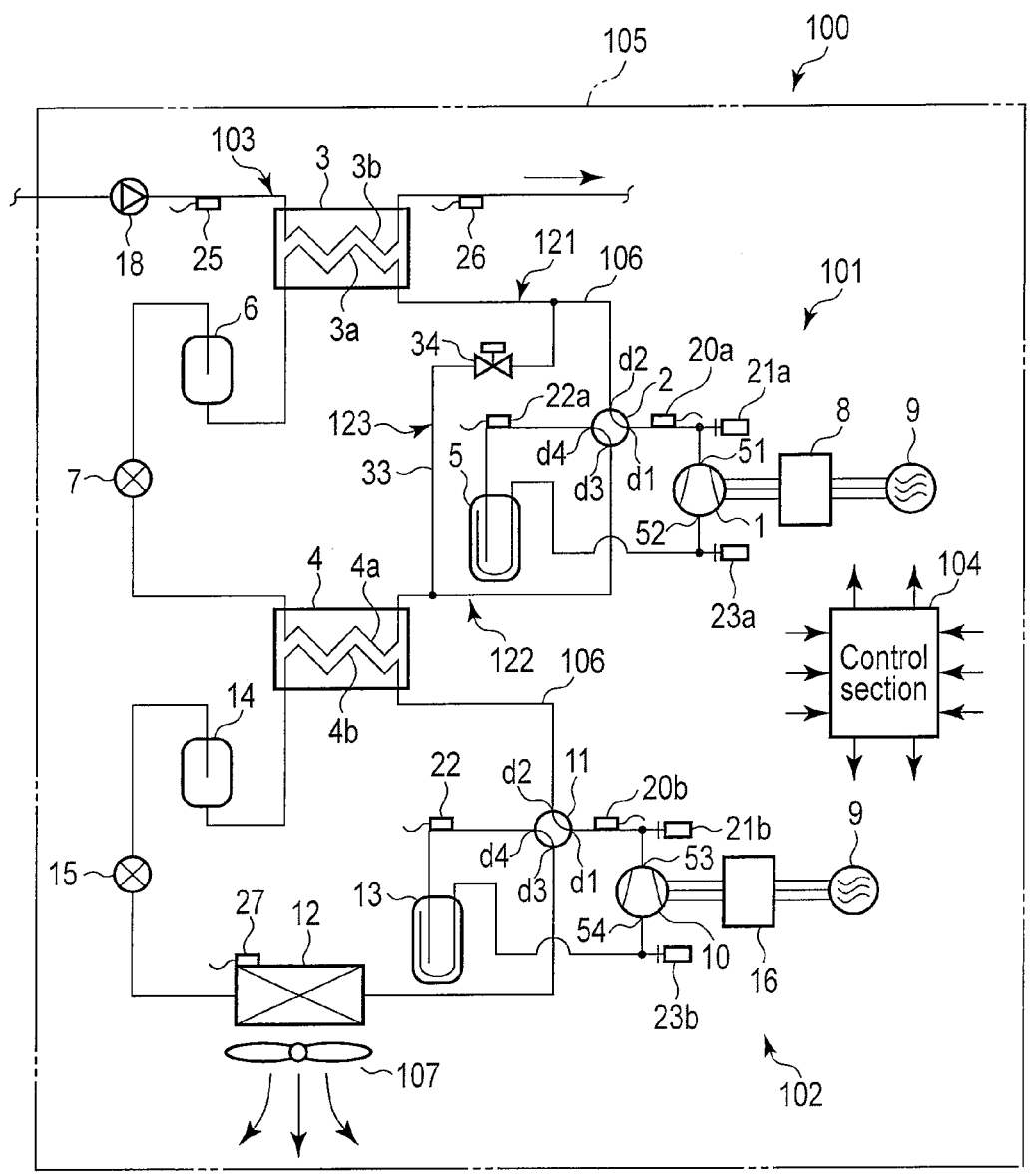
FIG. 4 is a diagram of a refrigeration cycle configuration of a cascade refrigeration cycle apparatus according to a third embodiment.

FIG. 4 is a diagram of a refrigeration cycle configuration of the cascade refrigeration cycle apparatus 100 applied to a hot water supply according to a third embodiment. Basically, the refrigeration cycle configuration in the third embodiment is the same as the refrigeration cycle configuration in the first embodiment described with reference to FIG. 1. The same components of the third embodiment as the corresponding components of the first embodiment shown in FIG. 1 are denoted by the same reference numbers and will not be newly described.

In this case, the high-temperature-side refrigeration circuit 101 comprises a bypass circuit 123 that allows for communication between a high-pressure piping system 121 extending from the high-temperature-side compressor 1 through the primary-side channel 3a in the water heat exchanger 3 and the high-temperature-side receiver 6 to the high-temperature-side expander 7 and a low-pressure piping system 122 extending from the high-temperature-side expander 7 through the primary-side channel 4a in the cascade heat exchanger 4 and the high-temperature-side accumulator 5 to the high-temperature-side compressor 1.

In actuality, one end of a bypass pipe 33 forming the bypass circuit 123 is connected to the refrigerant piping 106, through which the second port d2 of the high-temperature-side four-way selector valve 2 and the primary-side channel 3a in the water heat exchanger 3 are in communication with each other. The other end of the bypass pipe 33 is connected to the refrigerant piping 106, through which and the primary-side channel 4a in the cascade heat exchanger 4 and the third port d3 of the four-way selector valve 2 are in communication with each other.

The bypass pipe 33 comprises an on-off valve (opening and closing unit) 34 that is opened and closed by the control section 104 in a controllable manner.

The control section 104 performs control as described above and performs the refrigeration cycle operation (heating operation mode) as described above, to act as a hot water supply system. The control section 104 operates similarly in the defrosting operation mode. In either of the operations, the on-off valve 34 in the bypass circuit 123 is kept closed in a controllable manner.

When the defrosting operation ends, the control section 104 opens the on-off valve 34 in the bypass circuit 123 in a controllable manner and further actuates the low-temperature-side compressor 10 and then the high-temperature-side compressor 1 in a controllable manner. Alternatively, when the outside air temperature is very low, similar control is performed when the refrigeration cycle operation is started.

That is, for the defrosting operation, the four-way selector valves 2 and 11 in the high-temperature-side refrigeration circuit 101 and the low-temperature-side refrigeration circuit 102 are switched to a cycle opposite to the cycle during the refrigeration cycle operation (heating operation mode). The primary-side channel 4a in the cascade heat exchanger 4 included in the high-temperature-side refrigeration circuit 101 acts as an evaporator during the refrigeration cycle operation and as a condenser during the defrosting operation.

Thus, when the defrosting operation ends, a liquid refrigerant that is a condensed refrigerant is likely to have been collected in the primary-side channel 4a in the cascade heat exchanger 4. Furthermore, when the outside air temperature is very low, the evaporated refrigerant collected in the primary-side channel 4a in the cascade heat exchanger 4 has been cooled into a liquid refrigerant, that is, what is called a collapse has occurred, while the operation is stopped.

In such a state, the four-way selector valves 2 and 11 are simply switched from the defrosting operation mode, and the refrigeration cycle operation is started. Alternatively, the refrigeration cycle operation is started when the outside air temperature is very low. A liquid refrigerant exceeding the gas-liquid separation capacity of the high-temperature-side accumulator 5 is sucked from the primary-side channel 4a in the cascade heat exchanger 4 into the high-temperature-side compressor 1, causing a problem associated with a liquid back flow.

Thus, when the defrosting operation ends or when the refrigeration cycle operation is started while the outside air temperature is very low, the control section 104 opens the on-off valve 34 in the bypass circuit 123 in a controllable manner as described above.

This makes the pressure in the high-pressure piping system 121 and the pressure in the low-pressure piping system 122 in the high-temperature-side refrigeration circuit 101 equal. Then, the control section 104 switches the four-way selector valves 2 and 11 to the normal refrigeration cycle operation state and drives the low-temperature-side compressor 10 in a controllable manner.

The refrigerant circulates through the low-temperature-side refrigeration circuit 102. A high-temperature, high-pressure gas refrigerant concentrates in the secondary-side channel 4b in the cascade heat exchanger 4. The resultant condensation heat is absorbed by the primary-side channel 4a in the cascade heat exchanger 4. Thus, the liquid refrigerant collected in the primary-side channel 4a is heated and evaporated. The evaporated refrigerant is guided to the high-pressure piping system 121 in the high-temperature-side refrigeration circuit 101 via the bypass circuit 123.

When the low-temperature-side compressor 10 has operated continuously for a predetermined time, the control section 104 closes the on-off valve 34 in the bypass circuit 123 and starts operating the high-temperature-side compressor 1 in a controllable manner.

Thus, the high-temperature-side refrigeration circuit 101 performs the normal refrigeration cycle operation, while preventing a possible liquid back flow to the high-temperature-side compressor 1. This advantageously improves the reliability of the cascade refrigeration cycle apparatus 100 and allows the high-temperature-side accumulator 5 to be miniaturized or eliminates the need for the high-temperature-side accumulator 5.

To determine when to start the operation of the high-temperature-side compressor 1, for example, the pressure measured by the pressure sensor 21a or 23a in the high-temperature-side refrigeration circuit 101 or the change in pressure (deviation) is used. The on-off valve 34 in the bypass circuit 123 in the high-temperature-side refrigeration circuit 101 remains open until the high-temperature-side compressor 1 starts the operation, and thus, either of the pressure sensors may be used to obtain the value.

Furthermore, the high-pressure-side pressure (the discharge pressure of the low-temperature-side compressor 10) measured by the pressure sensor 21b in the low-temperature-side refrigeration circuit 102 or the change in high-pressure-side pressure may be used. This enables a reduction in the possibility of abnormally stopping the low-temperature-side compressor 10 due to an excessive rise in high pressure.

Alternatively, the difference in actuation time between the high-temperature-side compressor 1 and the low-temperature-side compressor 10 may be experimentally determined and used for actuation control.

Moreover, when the refrigeration cycle operation is started, both the high-temperature-side compressor 1 and the low-temperature-side compressor 10 are actuated at the respective set operating frequencies as is the case with the first embodiment. However, when each of the compressors 1 and 10 has reached the set operating frequency, the control section 104 maintains the operating frequency in a controllable manner until a predetermined time has elapsed.

That is, both the high-temperature-side compressor 1 and the low-temperature-side compressor 10 are operated at the same operating frequency as the set value for the given time to stabilize the level of lubricant collected in the condensers 1 and 10. Thus, the reliability of the compressors can be improved.

Furthermore, when a predetermined time has passed since the controllable actuation of the low-temperature-side compressor 10, the control section 104 actuates the high-temperature-side compressor 1 in a controllable manner. The predetermined time is obtained through various tests. The elapsed predetermined time is used as an indication that a certain amount of the high-temperature-side refrigerant in the primary-side channel 4a in the cascade heat exchanger 4 has evaporated to reduce the amount of liquid back flow to the high-temperature-side compressor 1 to a specified value or less.

Furthermore, when a predetermined time has elapsed subsequent to the actuation of the low-temperature-side compressor 10, the control section 104 actuates the high-temperature-side compressor 1 in a controllable manner. Additionally, even before the predetermined time has elapsed, the control section 104 actuates the high-temperature-side compressor 1 in a controllable manner upon detecting that the high-pressure-side pressure in the low-temperature-side refrigeration circuit 102 (the discharge pressure of the low-temperature-side compressor 10) has reached a predetermined value or greater.

That is, the actuation timing for the high-temperature-side compressor 1 is controlled not only temporally but also based on the high-pressure-side pressure in the low-temperature-side refrigeration circuit 102 to prevent the high-temperature-side compressor 1 from being stopped by abnormally elevated pressure. Instead of the high-pressure-side pressure in the low-temperature-side refrigeration circuit 102, the change in high-pressure-side pressure may be used.

That is, while the liquid refrigerant is evaporating in the primary-side channel 4a in the cascade heat exchanger 4, the high-pressure-side pressure in the low-temperature-side refrigeration circuit 102 gradually rises at a predetermined rate. However, when the evaporation of the liquid refrigerant in the primary-side channel 4a completes to change all of the liquid refrigerant into a gas refrigerant, the rate of rise in the high-pressure-side pressure in the low-temperature-side refrigeration circuit 102 increases rapidly.

Thus, the operation of the high-temperature-side compressor 1 is started when the rate of rise in the high-pressure-side pressure during a predetermined time in the low-temperature-side refrigeration circuit 102 has reached a predetermined value or greater.

Furthermore, when a predetermined time has elapsed subsequent to the actuation of the low-temperature-side compressor 10, the control section 104 actuates the high-temperature-side compressor 1 in a controllable manner. However, even before the predetermined time has elapsed, the control section 104 actuates the high-temperature-side compressor 1 in a controllable manner upon detecting that the pressure in the high-temperature-side refrigeration circuit 101 has reached a predetermined value or greater. This prevents the high-temperature-side compressor 1 from being stopped by an abnormal increase in the high-pressure-side pressure in the low-temperature-side refrigeration circuit 102.

Instead of the pressure in the high-temperature-side refrigeration circuit 101, the change in pressure may be used. That is, while the liquid refrigerant is evaporating in the primary-side channel 4a in the cascade heat exchanger 4, the pressure in the high-temperature-side refrigeration circuit 101 gradually rises at a predetermined rate. However, when the evaporation of the liquid refrigerant completes to change all of the liquid refrigerant into a gas refrigerant, the rate of rise in pressure during a predetermined time decreases.

Thus, the operation of the high-temperature-side compressor 1 is started when the rate of rise in the pressure during a predetermined time in the high-temperature-side refrigeration circuit 101 has reached a predetermined value or less.

Figure 5:
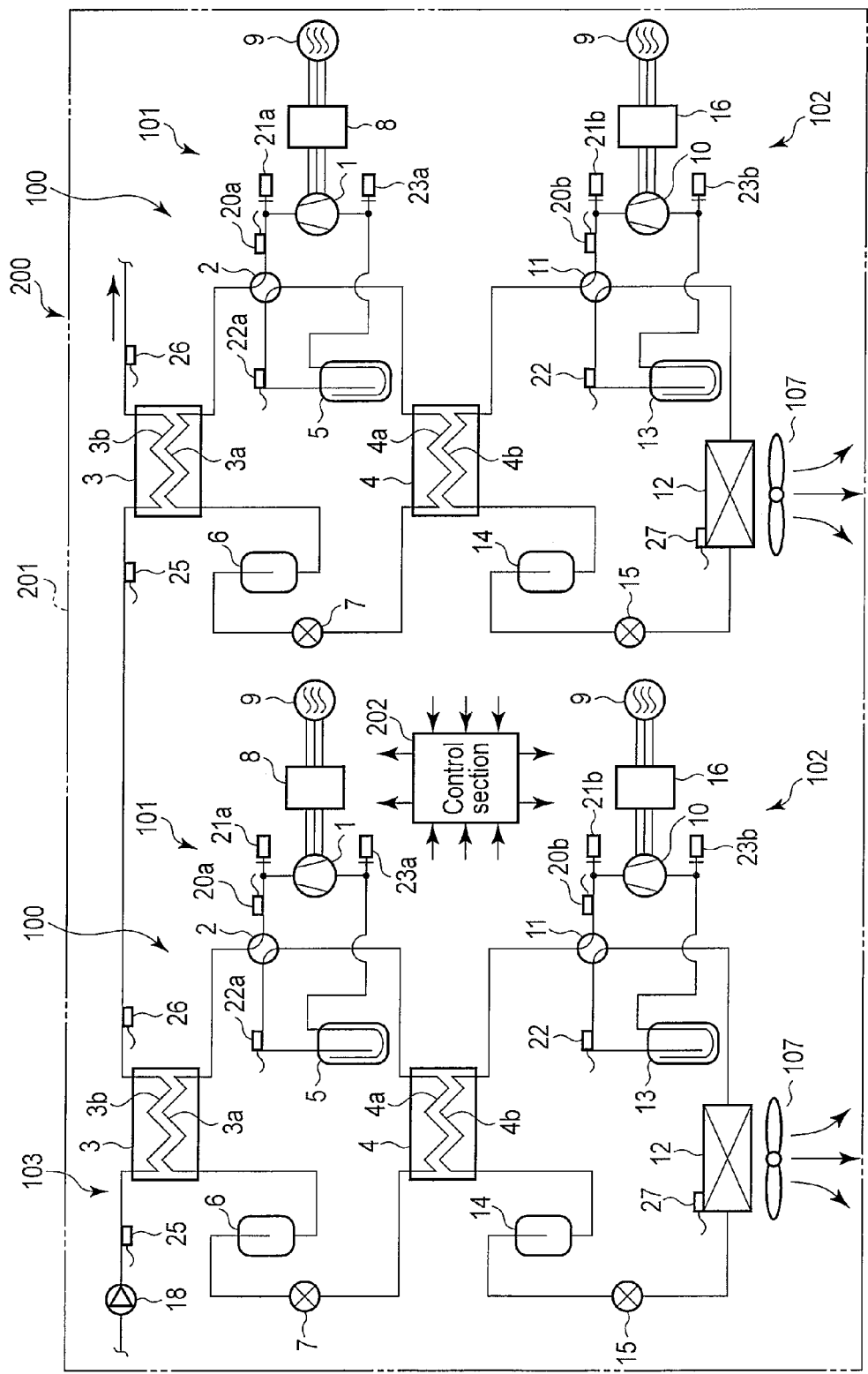
FIG. 5 is a diagram of a refrigeration cycle configuration of a cascade refrigeration cycle apparatus according to a fourth embodiment.

FIG. 5 is a diagram of a refrigeration cycle configuration of a cascade refrigeration cycle apparatus complex 200 applied to a hot water supply system according to a fourth embodiment.

The cascade refrigeration cycle apparatus complex 200 comprises a plurality of (two) cascade refrigeration cycle apparatuses 100 according to the first embodiment described above connected together in series along the hot water piping 103 and accommodated in an identical housing 201. Each of the cascade refrigeration cycle apparatuses 100 uses the same components as those of the first embodiment. The components are denoted by the same reference numbers and will not be newly described.

In the cascade refrigeration cycle apparatus complex 200, when the plurality of cascade refrigeration cycle apparatuses 100 is simultaneously actuated to start the refrigeration cycle operation, a surge current flows through the inverter apparatuses 8 and 16 and temporarily increases. In some cases, the power supply capacity of the facility may be exceeded, damaging power supply cables or installed equipment.

Thus, a control section (control means) 202 provided in the cascade refrigeration cycle apparatus complex 200 sequentially controls the actuation of the cascade refrigeration cycle apparatuses 100 by delaying the actuation of each of the cascade refrigeration cycle apparatuses 100 by a predetermined time. This enables a possible increase in current caused by a surge current to be suppressed, ensuring the reliability of the cascade refrigeration cycle apparatus complex 200, which is a piece of equipment.

Moreover, the cascade refrigeration cycle apparatus complex 200 comprises a plurality of water heat exchangers 3 disposed in series with the hot water piping 103, and thus, the control section 202 controllably actuates, first, the upstream cascade refrigeration cycle apparatus 100 (located on the left of FIG. 5) and subsequently the downstream cascade refrigeration cycle apparatus 100 (located on the right of FIG. 5).

In contrast, if the downstream cascade refrigeration cycle apparatus 100 is actuated first, water or hot water flowing through the secondary-side channel 3*b* in the water heat exchanger 3 in the upstream cascade refrigeration cycle apparatus 100, actuated later, increases the temperature of the inlet side of the downstream water heat exchanger 3. The condensation temperature of the refrigerant flowing through the primary-side channel 3*a* correspondingly increases.

This makes the cycle control difficult to stabilize. Thus, in the cascade refrigeration cycle apparatus complex 200 with the plurality of cascade refrigeration cycle apparatuses 100 connected together in series, the upstream cascade refrigeration cycle apparatus 100 may be actuated first, and the downstream cascade refrigeration cycle apparatus may subsequently be actuated.

Although not shown in the drawings, the water heat exchangers 3 in the plurality of cascade refrigeration cycle apparatuses 100 may be connected together in parallel with respect to the hot water piping 103. In this case, either of the cascade refrigeration cycle apparatuses 100 may be actuated first.

Furthermore, in the first to fourth embodiments, both the high-temperature-side refrigeration circuit 101 and the low-temperature-side refrigeration circuit 102 are mounted in the identical housing 105 or 201. This enables a reduction in the length of the refrigerant piping 106 in both the high-temperature-side refrigeration circuit 101 and the low-temperature-side refrigeration circuit 102. Therefore, a pressure loss and the amount of heat radiated from the refrigerant piping can be reduced, thus improving efficiency.

Moreover, the reduced length of the refrigerant piping 106 enables a reduction in the amount of refrigerant filled. Furthermore, refrigerator oil discharged from the high-temperature-side compressor 1 and the low-temperature-side compressor 10 along with the discharged refrigerant returns to the high-temperature-side compressor 1 and the low-temperature-side compressor 10 in a short time. This enables the refrigerator oil to be prevented from being in short supply, thus improving reliability.

The present embodiments have been described. However, the embodiments have been presented as examples and are not intended to limit the scope of the embodiments. The new embodiments may be implemented in various other forms, and various omissions, replacements, or changes may be made to the embodiments without departing from the spirit of the present invention. The embodiments and modifications thereof are included not only in the scope and spirit of the invention but also in the scope of the invention set forth in the claims and equivalents thereof.

EXPLANATION OF REFERENCE SYMBOLS

1 . . . High-pressure-side compressor, 3 . . . Water heat exchanger, 3*a* . . . Primary-side channel (high-temperature-side condenser) in water heat exchanger, 4 . . . Cascade heat exchanger, 7 . . . High-temperature-side expander, 8 . . . High-temperature-side inverter apparatus, 9 . . . Commercial AC power supply, 10 . . . Low-temperature-side compressor, 12 . . . Air heat exchanger, 15 . . . Low-temperature-side expander, 16 . . . Low-temperature-side inverter apparatus, 34 . . . On-off valve, 100 . . . Cascade refrigeration cycle apparatus, 101 . . . High-temperature-side refrigeration circuit, 102 . . . Low-temperature-side refrigeration circuit, 103 . . . Hot water piping, 104 . . . Control section, 106 . . . Refrigerant piping, 121 . . . High-pressure piping system, 122 . . . Low-pressure piping system, 123 . . . Bypass circuit, 200 . . . Cascade refrigeration cycle apparatus complex, 202 . . . Control section.

What is claimed is:
1. A cascade refrigeration cycle apparatus comprising:
a high-temperature-side refrigeration circuit including:
   a high-temperature-side compressor,
   a high-temperature-side four-way selector valve,
   a high-temperature-side condenser,
   a high-temperature-side expander, and
   a primary-side channel of a cascade heat exchanger,
wherein said high-temperature-side compressor, said high-temperature-side four-way selector valve, said high-temperature-side condenser, said high-temperature-side expander and said primary-side channel are in communication with one another via high-temperature-side refrigerant piping, and
wherein in a refrigeration cycle operation, the high-temperature-side refrigeration circuit circulates a first refrigerant in a first direction, the first direction being a direction in which the first refrigerant circulates sequentially from the high-temperature-side compressor through the high-temperature-side four-way selector valve, the high-temperature-side condenser, the high-temperature-side expander, and the primary-side channel of the cascade heat exchanger and back to the high-temperature-side compressor;
a low-temperature-side refrigeration circuit including:
   a low-temperature-side compressor,
   a low-temperature-side four-way selector valve,
   a secondary-side channel of the cascade heat exchanger,
   a low-temperature-side expander, and
   an air-heat exchanger;
wherein said low-temperature-side compressor, said low-temperature-side four-way selector valve, said secondary-side channel of the cascade heat exchanger, said low-temperature-side expander and said air-heat exchanger are in communication with one another via low-temperature-side refrigerant piping, wherein in the refrigeration cycle operation, the low-temperature-side refrigeration circuit circulates a second refrigerant in a second direction, the second direction being a direction in which the second refrigerant circulates sequentially from the low-temperature-side compressor through the low-temperature-side four-way selector valve, the secondary-side channel in the cascade heat exchanger, the low-temperature-side expander, and the air-heat exchanger and back to the low-temperature-side compressor;

wherein in the refrigeration cycle operation, the high-temperature-side four-way selector valve and the low-temperature-side four-way selector valve are in a first state position, wherein the apparatus further comprises:

an inverter connected to at least one of the high-temperature-side compressor of the high-temperature-side refrigeration circuit and the low-temperature-side compressor of the low-temperature-side refrigeration circuit;

a bypass pipe provided in the high-temperature-side refrigeration circuit which enables communication between:

the high-temperature-side refrigerant piping at a first point between the high-temperature-side four-way selector valve and the high-temperature-side condenser, and the high-temperature-side refrigerant piping at a second point between the primary-side channel of the cascade heat exchanger and the high-temperature-side four-way selector valve;

a flow control device provided in the bypass pipe; and a controller which controls the inverter so that a set operating frequency for the high-temperature-side compressor is higher than a set operating frequency for the low-temperature-side compressor when the control section starts the refrigeration cycle operation;

wherein the controller operates the apparatus in a defrosting operation, wherein in the defrosting operation, the high-temperature side four-way selector valve and the low-temperature-side four-way selector valve are switched from said first state position to a second state position, to thereby reverse the first refrigerant and the second refrigerant in directions opposite to the first and second direction, respectively, and wherein when the control section ends the defrosting operation, the controller opens the flow control device to allow the first refrigerant to flow through the bypass pipe, switches the high-temperature side four-way selector valve and the low-temperature-side four-way selector valve back to the first state position, starts operating the low-temperature-side compressor, closes the flow control device, and starts operating the high-temperature-side compressor, in this order.

* * * * *